Feb. 18, 1947. H. C. SWIFT 2,416,129
FLUID TORQUE CONVERTER
Filed Oct. 30, 1944

INVENTOR.
HARVEY C. SWIFT
BY
ATTORNEY

Patented Feb. 18, 1947

2,416,129

UNITED STATES PATENT OFFICE 2,416,129

FLUID TORQUE CONVERTER

Harvey C. Swift, Detroit, Mich., assignor to Bendix Aviation Corporation, Detroit, Mich., a corporation of Delaware Application October 30, 1944, Serial No. 561,075

6 Claims. (Cl. 60—54)

This invention relates to fluid drives, and more particularly to that class generally known as fluid torque converters.

Broadly the invention comprehends a fluid torque converter including a retractable reaction member, and means controlled by movement of the member operative to hold the member against movement after initial movement thereof.

An object of the invention is to provide a fluid torque converter having fluid pressure actuated means for holding the reaction member of the converter against movement when torque multiplication is required.

Figure 1:
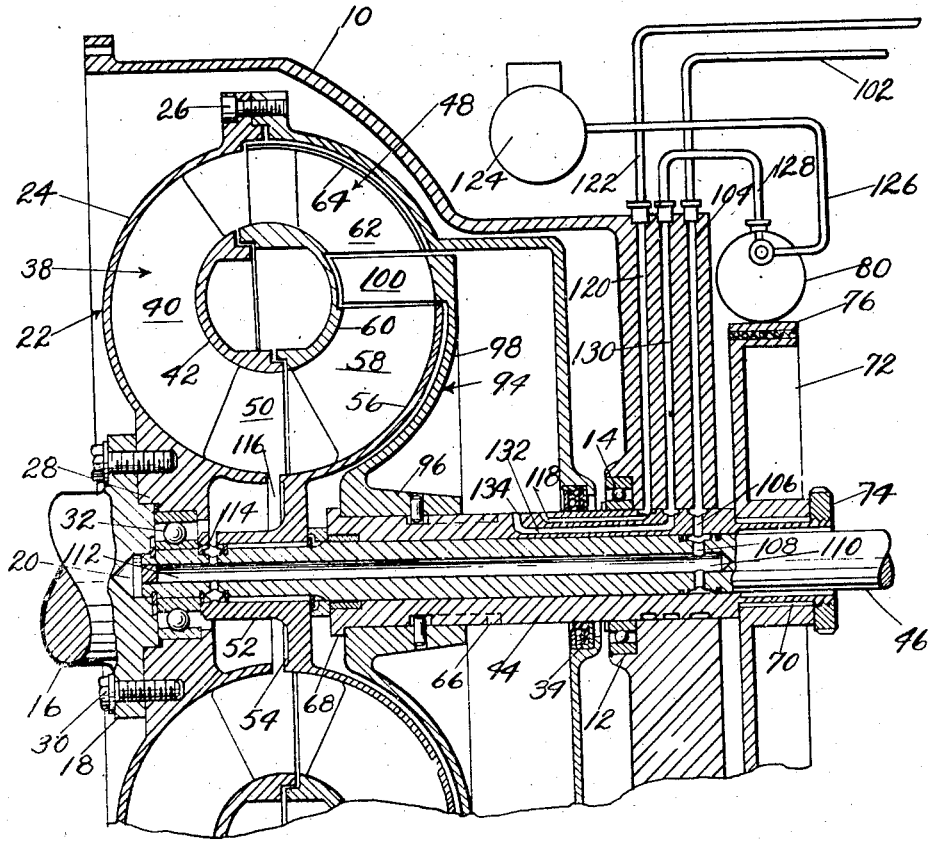
Figure 2:
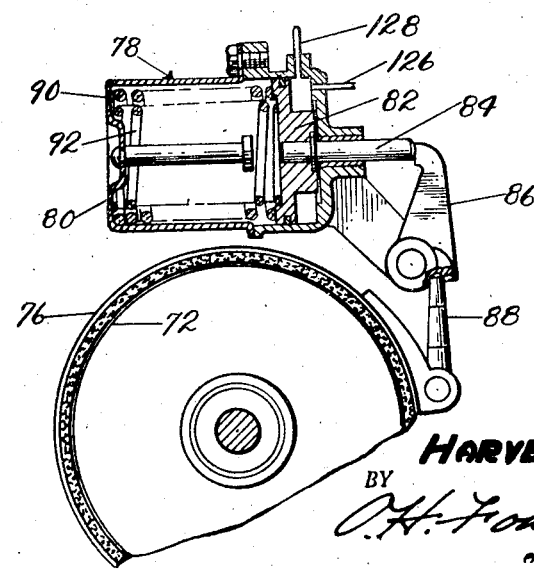

Other objects and advantages of the invention will appear from the following description when taken in connection with the drawing forming a part of this specification, and in which, Fig. 1 is a vertical sectional view of a fluid torque converter embodying the invention, parts being broken away; and Fig. 2 is a detail view illustrating the fluid pressure unit for the brake.

Referring to the drawing for more specific details of the invention, 10 represents a bell housing having a concentrically disposed hub 12 supporting a bearing 14. The bell housing is adapted to be bolted or otherwise secured to the crankcase of an internal combustion engine in axial alignment with the crankshaft 16 of the engine. The shaft has a conventional flange 18 and an axial recess 20.

A torque converter indicated generally at 22 is enclosed in the bell housing 10. The converter includes a two-part housing 24 secured together as by bolts 26. The housing has a concentrically disposed hub 28 secured to the flange 18 as by bolts 30, and fitted in the hub is a bearing 32. The housing also has a hub 34 arranged in oppositely disposed relation to the hub 28, and a fluid seal is fitted in the hub 34.

An impeller indicated generally at 38 includes a plurality of spaced blades 40 suitably secured to the inner wall of the housing 24, and an inner shroud 42 supported by the blades.

A sleeve 44 journaled in the bearing 14 of the bell housing 10 extends into the housing 24 and outwardly beyond the wall of the bell housing. Suitable means is provided to inhibit axial movement of the sleeve, and a driven shaft 46 extended through the sleeve 44 is journaled on the bearing 32 in the hub of the housing 24.

A two-stage turbine 48 suitable for cooperation with the impeller 38 provides in conjunction therewith a fluid circuit 50. The turbine includes a hub 52 splined to the driven shaft 46. The hub has a radial flange 54 supporting a web 56, and spaced vanes 58 secured to the web support, an inner shroud 60 for cooperation with the inner shroud 42 of the impeller, and the inner shroud 60 has secured thereto spaced vanes 62 supporting an outer shroud 64. The vanes 62 constitute the first stage of the turbine, and the vanes 58 constitute the second stage of the turbine.

The sleeve 44 hereinabove referred to has a threaded portion 66 and a radial flange 68 on that end of the sleeve adjacent the threaded portion. The other end of the sleeve has a reduced portion 70 splined for the reception of a brake drum 72 fitted thereon and secured against displacement as by a nut 74 threaded on the reduced portion.

A brake band 76 for cooperation with the drum 72 is controlled as by a fluid pressure actuated unit 78. This unit includes a cylinder 80 having therein a reciprocable piston 82 carrying a plunger 84 connected to the brake band as by a lever 86 and a push rod 88. The piston is normally held in retracted position by springs 90 and 92 interposed between the piston and the head of the cylinder. When the piston is in retracted position, the brake band 76 is applied to the drum 72 with sufficient force to inhibit rotation thereof.

A reaction member indicated generally at 94 includes a carrier 96 mounted for travel on the threaded portion 66 of the sleeve 44. The carrier has thereon a web 98 supporting spaced reaction vanes 100 movable into and out of the circuit between the first and second stages of the turbine.

The fluid system for the converter includes a supply pipe 102 leading from a suitable source of fluid supply, not shown, to a passage 104 in the wall of the bell housing. The passage 104 communicates with a passage 106 in the sleeve 44, which in turn communicates with a radial passage 108 in the driven shaft, and the passage 108 communicates with a passage 110 extended axially through the shaft. The passage 110 is connected by a passage 112 and a port 114 to a passage 116 leading to the fluid circuit 50. Fluid is returned from the circuit by way of the clearance around the reaction member to the housing 24, thence through a passage 118 in the sleeve 44, a passage 120 in the bell housing 10 and pipe line 122 to the source of supply.

A fluid pressure pump 124 adapted to be connected to a suitable source of fluid supply is connected by a pipe line 126 to the cylinder 80 of the fluid pressure actuated unit 78, and a pipe line 128 connects the cylinder 80 to a passage 130 in the wall of the bell housing 10. The passage 130 communicates with a passage 132 in the sleeve 44 discharging through a port 134 controlled by the carrier 96.

In a normal operation, upon rotation of the impeller 38 the fluid in the circuit 50 is energized and the energy of the fluid is received on the first and second stages of the turbine and also on the faces of the reaction vanes 100, causing the reaction vanes to move quickly into the circuit. Concomitantly with this operation, the hub of the reaction member uncovers the port 134. This results in relief of pressure in the fluid pressure unit 78, whereupon the springs 90 and 92 become effective to apply the brake 76 so as to hold the sleeve 44 and accordingly the reaction member 94 against movement so as to attain torque multiplication.

Upon attaining a predetermined speed, the flow of fluid in the circuit changes and impinges on the backs of the reaction vanes 100. This causes the reaction member to move quickly out of the circuit. As the reaction member returns to its retracted position, the port 134 is closed, and this results in introducing pressure in the fluid actuated unit 78, whereupon the springs 90 and 92 are compressed so as to release the brake 76, and thereafter the apparatus operates as a fluid coupling.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid transmission comprising primary means for energizing fluid and secondary means for receiving energy from the fluid providing in conjunction with one another a fluid circuit, a reaction member movable into and out of the circuit, means for holding the member against movement when in the circuit and fluid pressure means under control of the reaction member for releasing the holding means.

2. A fluid transmission comprising primary means for energizing fluid and secondary means for receiving energy from the fluid providing in conjunction with one another a fluid circuit, a rotatable sleeve, a reaction member movable on the sleeve into and out of the circuit, means for holding the sleeve against movement upon initial movement of the reaction member into the circuit and fluid pressure means controlled by the reaction member for releasing the holding means.

3. A fluid transmission comprising primary means for energizing fluid and secondary means for receiving energy from the fluid providing in conjunction with one another a fluid circuit, a rotatable sleeve, a reaction member mounted on the sleeve for rotation and for axial travel into and out of the circuit, means for holding the sleeve against movement upon initial movement of the member into the circuit and fluid pressure means under control of the reaction member operative to release the holding means.

4. A fluid transmission comprising primary means for energizing fluid and secondary means for receiving energy from the fluid providing in conjunction with one another a fluid power transmitting circuit, a rotatable sleeve, a brake for the sleeve, a reaction member mounted on the sleeve for rotation and for axial movement into and out of the circuit, and fluid pressure actuated means for the brake controlled by the reaction member.

5. A fluid transmission comprising primary means for energizing fluid and secondary means for receiving energy from the fluid providing in conjunction with one another a fluid circuit, a rotatable sleeve, a reaction member movable on the sleeve, a brake drum on the sleeve, a brake shoe for cooperation therewith, and a fluid pressure actuated means for the brake shoe under the control of the reaction member.

6. A fluid transmission comprising a driving shaft and a driven shaft, primary means for energizing fluid on the driving shaft and secondary means for receiving energy on the driven shaft providing in conjunction with one another a fluid circuit, a rotatable sleeve on the driven shaft, a brake on the sleeve, a reaction member mounted on the sleeve for relative rotation and for axial movement into and out of the circuit, and fluid pressure actuated means for the brake under control of the reaction member.

HARVEY C. SWIFT.

REFERENCES CITED

The following references are of record in the file of this patent:

UNITED STATES PATENTS

| Number | Name | Date |
|---|---|---|
| 2,342,208 | Miller | Feb. 22, 1944 |
| 2,235,370 | Jandasek | Mar. 18, 1941 |
| 2,327,647 | Jandasek | Aug. 24, 1943 |